United States Patent
Meyer

(10) Patent No.: US 7,693,932 B1
(45) Date of Patent: Apr. 6, 2010

(54) SYSTEM AND METHOD FOR LOCATING A RESOURCE LOCATOR ASSOCIATED WITH A RESOURCE OF INTEREST

(75) Inventor: Conrad K Meyer, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2114 days.

(21) Appl. No.: 10/047,629

(22) Filed: Jan. 15, 2002

(51) Int. Cl.
*G06F 15/16* (2006.01)
*G06F 17/00* (2006.01)

(52) U.S. Cl. ........................ 709/203; 707/10

(58) Field of Classification Search ................ 709/203; 707/3; 717/115
See application file for complete search history.

(56) References Cited

U.S. PATENT DOCUMENTS

| | | | | |
|---|---|---|---|---|
| 6,009,459 A | * | 12/1999 | Belfiore et al. | 709/203 |
| 6,092,100 A | * | 7/2000 | Berstis et al. | 709/203 |
| 6,332,158 B1 | * | 12/2001 | Risley et al. | 709/219 |
| 6,424,980 B1 | * | 7/2002 | Iizuka et al. | 715/513 |
| 6,529,939 B1 | * | 3/2003 | Kraft | 709/203 |
| 6,539,538 B1 | * | 3/2003 | Brewster et al. | 717/115 |
| 7,383,299 B1 | * | 6/2008 | Hailpern et al. | 709/203 |
| 2002/0059192 A1 | * | 5/2002 | Ling | 707/3 |
| 2002/0156917 A1 | * | 10/2002 | Nye | 709/238 |

* cited by examiner

*Primary Examiner*—Wen-Tai Lin

(57) ABSTRACT

A system for accessing a resource locator (RL) associated with a resource wherein a RL search string is used to search a list of valid RLs to identify valid RLs similar to a predetermined specified RL. A list of valid RLs meeting criteria specified by the search string is generated and displayed for user review or selection.

29 Claims, 9 Drawing Sheets

SYSTEM AND METHOD FOR LOCATING A RESOURCE LOCATOR ASSOCIATED WITH A RESOURCE OF INTEREST

FIELD OF THE INVENTION

The present invention is generally related to a system for accessing content at a resource associated with a particular Resource Locator (RL). More particularly, the present invention is directed to a system for searching valid RLs to locate a RL associated with a resource of interest.

BACKGROUND OF THE INVENTION

The Internet provides access to many different sources of information. Many commercial concerns and organizations have recognized the value of the Internet in providing broad access to information concerning, for example, their respective products, services, location, contact information, purposes, goals, qualifications and more. The world wide web (WWW) is one component of the Internet that is widely used by people, companies or organizations to publish information in the form of web sites, or web pages. Often times, companies and organizations will adopt a domain name that is used, for example, as the uniform resource locator (URL) for accessing, for example, a web site associated with the particular company or organization. This domain/URL may correspond to, for example, the name of their company, organization, product line or related theme, for example. As a result, it is well known by many users of the Internet that when searching for information on a particular organization or company, the company name (product name, etc.) itself may in fact constitute the main part of the URL that would allow access to that company's/organizations web site. In view of this it is often common for a user to make a first attempt at accessing a company/organizations' web site by specifying, for example, the company or organization name, product name or common variations thereon as a part of the specified URL to be accessed using, for example, a web browser.

More particularly, as an example, where a company's name is, for example, "The Big Shop", a user may make a first attempt to access an associated web site by specifying a URL such as: "WWW.THEBIGSHOP.COM", or "WWW.BIG-SHOP.COM". If this URL is valid, the web page that corresponds to the URL will be accessed, retrieved and displayed for the viewer to peruse. However, the web page accessed may or may not be a web page that is actually associated with the particular company "The Big Shop".

Thus, the first attempts of specifying a web site URL in this way may be unsuccessful in accessing the web page associated with the desired company, organization or product. As many parties may seek out the same domain name to be associated with their particular company, organization or web site, it is often common for a domain name that incorporates a particular company or organization name to already be in use and registered to another party. Thus, a party may have to adopt some near variation on their company or organization name in order to incorporate it into a domain name that is actually available for registration. These "close" variations in domain names often make it difficult for a user to specify the domain name that is associated with the company or organizations whose web page they desire to access.

As a result, a user may use a search engine to locate a URL associated with the desired company or organization. A user must then specify key words that will be used by the search engine to generate a list of web sites. These web sites may or may not be relevant to the web site the user is looking for.

Thus, it is often difficult to access the web site of a particular party, company or organization without conducting a search engine search, specifying appropriate search terms and reviewing a listing of resources that are nowhere near relevant to the sought after information.

Thus, a heretofore unaddressed need exists in the industry to address the aforementioned deficiencies and inadequacies.

SUMMARY OF THE INVENTION

The present invention provides a system and method for accessing a resource associated with a Resource Locator (RL). Briefly described, in architecture, one embodiment of the system, among others, can be implemented as follows. A controller for receiving a RL search string from a user device is provided. Memory associated with the controller is provided for storing a list of valid RLs. The controller is configured to search the list of valid RLs in accordance with the RL search string.

The present invention can be viewed as providing methods for accessing a resource associated with a RL. In this regard, one embodiment of such a method, among others, can be broadly summarized by the following steps: input of a RL is received. The RL corresponds to a resource. It is then determined if the RL is valid. If it is not valid, input of a RL search string is solicited. Input of the RL search string is received. A predetermined index of valid RLs is searched in accordance with the RL search string to determine valid RLs that meet criteria specified by the RL search string.

DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DESCRIPTION OF THE INVENTION

The present invention provides a system and method for accessing a desired resource, such as, for example, hypertext mark-up language (html) format content, audio or video format content, text format or other content. The resource may be a resource accessible via a network such as, for example, the Internet.

Figure 1:
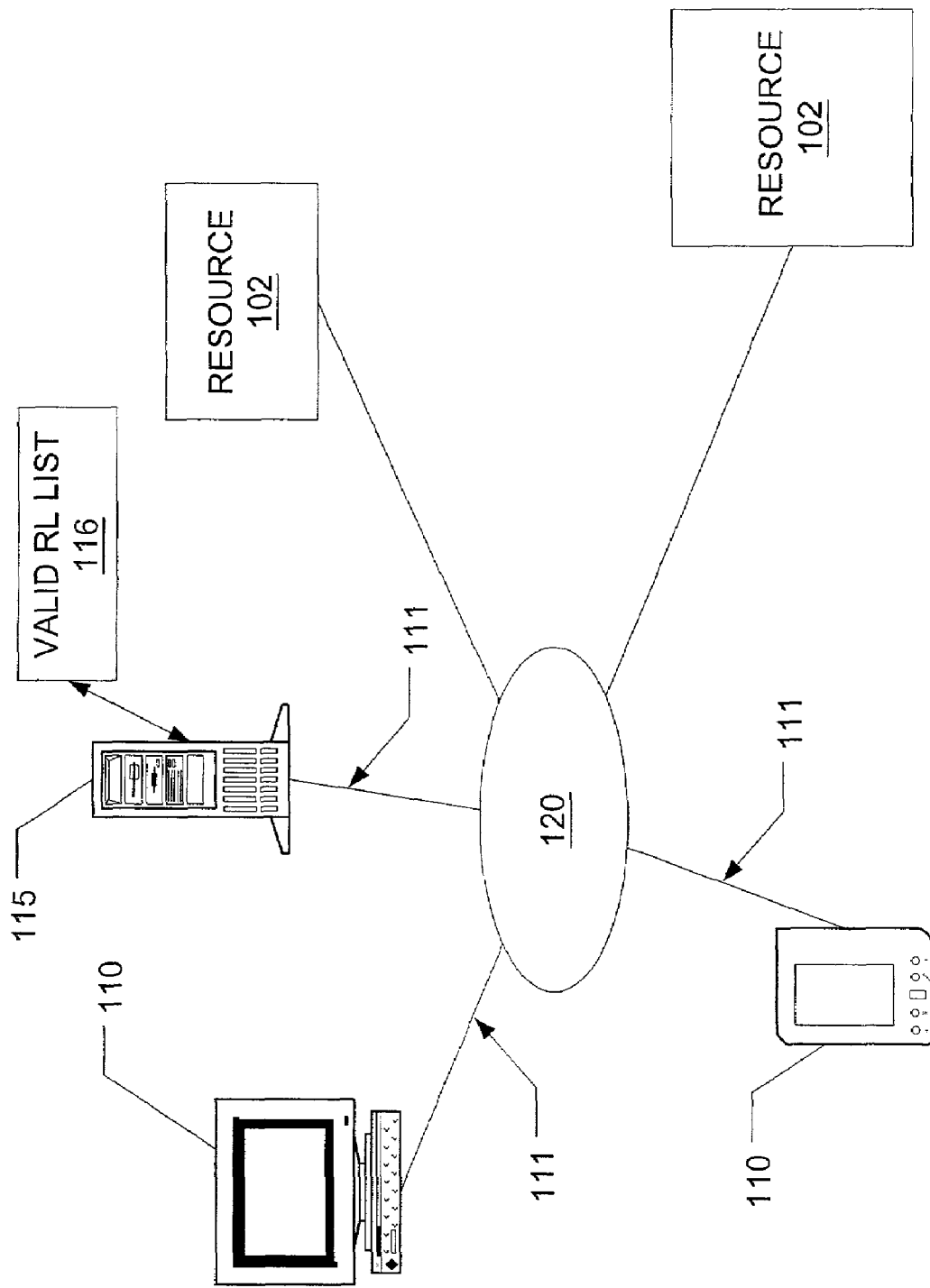
FIG. 1 is a block diagram illustrative of an embodiment of a representation of a system for accessing a resource of interest.

FIG. 1 is a diagram illustrating a system for accessing a desired resource via a network. A user device 110 is connected to a network 120 via a network link 111. User device 110 is preferably configured to access an information resource 102 via the network 120. The user device 110 is further configured to access a search engine server 115 during a search mode to identify and select a desired resource locator (RL) from a list of valid RLs (valid RL list 116) stored on memory associated with the search engine server 115. A resource locator may be, for example, a universal resource locator (URL). Each RL specified by the valid RL list 116 is preferably associated with a particular resource 102. A search engine server 115 is provided and is also connected to the network 120 via a network link 111. Network link 111 may be a wired or wireless interface. Network 120 may be, for example, a local area network (LAN) or a wide area network, such as, for example, the Internet.

Figure 2:
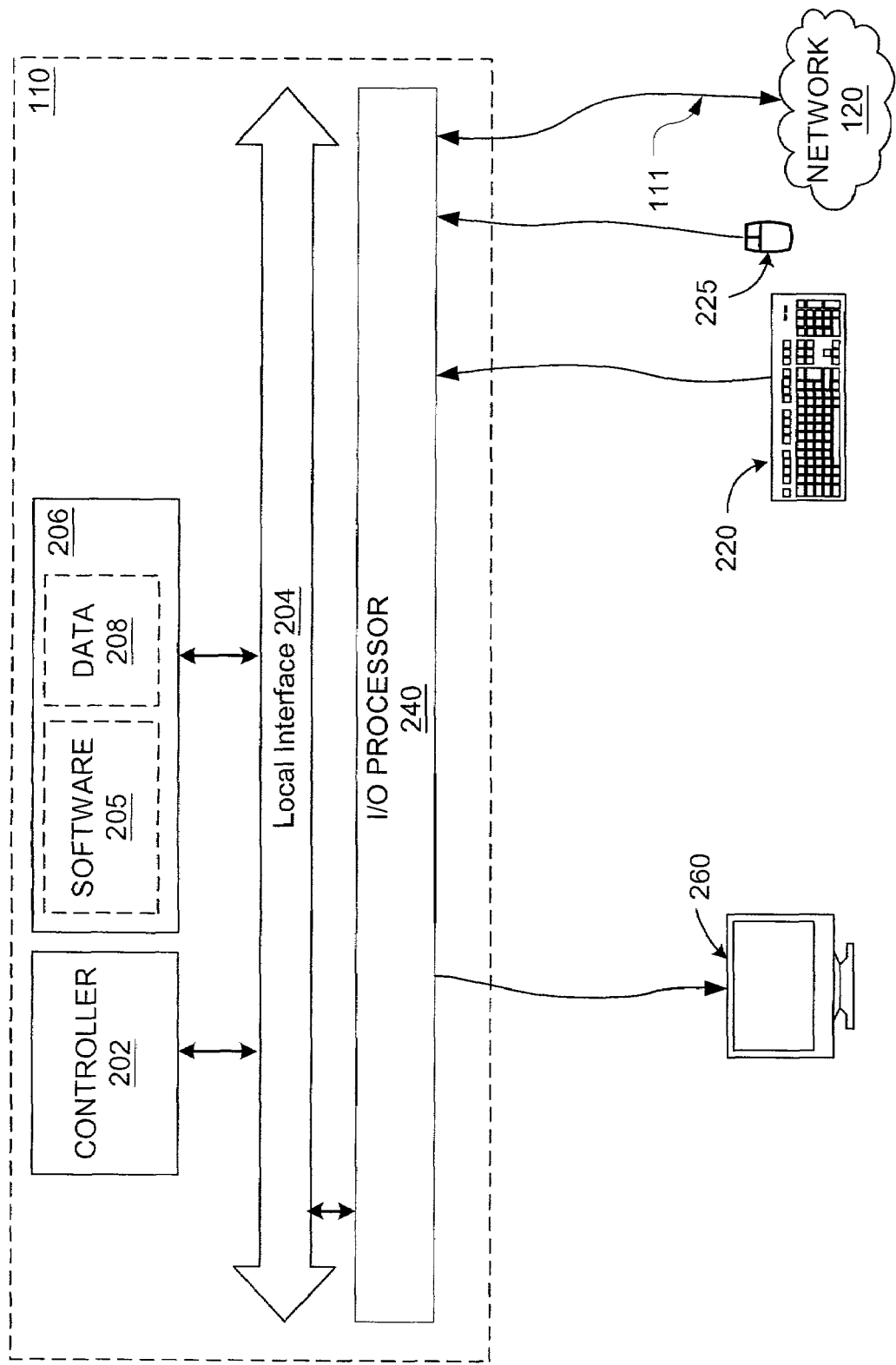
FIG. 2 is a block diagram illustrating a representative user device 110.

FIG. 2 shows a further description of user device 110. User device 110 includes a controller 202 and memory storage 206. Memory storage 206 may include memory for storing software 205 as well as data 208. Software 205 may include operational software for causing the various functions and operations of the user device 110 to be carried out. A local interface 204 is provided for transferring instructions and data between controller 202 and memory 206. Local interface 204 provides a conduit for transfer of electronic instructions and data from/to the input/output (I/O) processor 240. I/O processor 240 includes provisions for receiving data from, for example, a keyboard 220 and pointing device 225. I/O processor 240 also includes an interface 111 for connecting the user device 110 to a network 120 as well as outputting image data for display on a display device 260.

Display device 260 may be, for example, a cathode ray tube (CRT), liquid crystal display (LCD) or other type of display device. In one embodiment, display device 260 may be configured as a touch sensitive display/input device via which user input may be made. In this case, I/O processor 240 may be further configured to receive the input of a touch sensitive display device 260.

In a further embodiment, user device 110 is configured so that the functions and/or hardware of search engine server 115 (FIG. 1) are incorporated into the user device 110. In a further embodiment, the user device 110 is implemented via a stand-alone computer system, commonly referred to as a "computer workstation." Alternatively, user device 110 may be implemented, for example, as a personal digital assistant (PDA).

Figure 3:
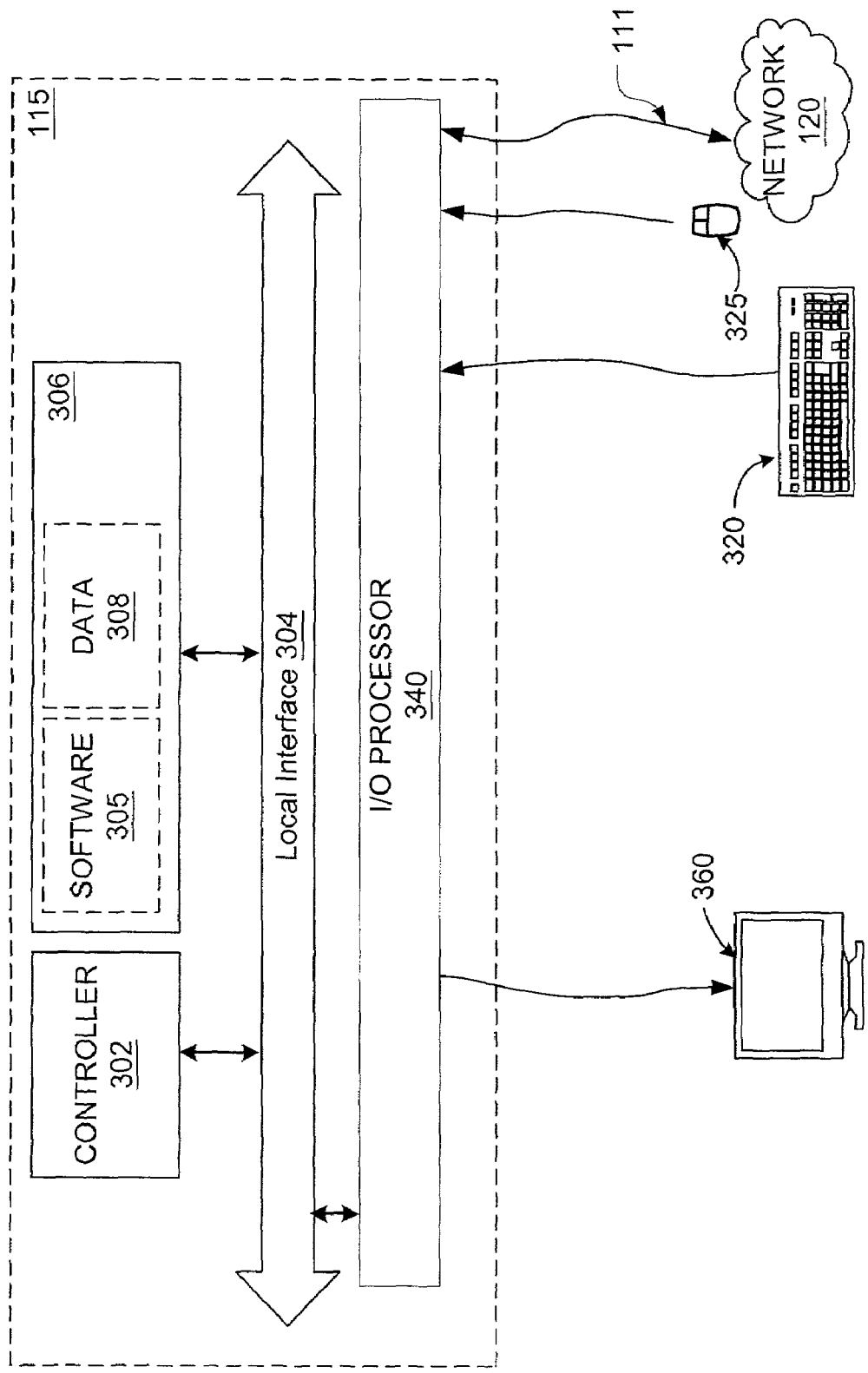
FIG. 3 is a block diagram illustrating an embodiment of a representative search engine server 115.

FIG. 3 shows a further description of search engine server 115. Search engine server 115 includes a controller 302 and memory storage 306. Memory storage 306 may include memory for storing software 305 as well as data 308. Data 308 may include, among other things, a valid RL list 116 (FIG. 1). Valid RL list 116 may also be stored on other memory associated with the search engine server 115 and accessible thereby via, for example, the network 120. Software 305 may include operational software for causing the various functions and operations of search engine server 115 to be carried out. A local interface 304 is provided for transferring instructions and data between controller 302 and memory 306. Local interface 304 provides a conduit for transfer of electronic instructions and data from/to the input/output (I/O) processor 340. I/O processor 340 includes provisions for receiving data from, for example, a keyboard 320 and pointing device 325. I/O processor 340 also includes an interface 111 for connecting the search engine server 115 to a network 120, as well as outputting image data for display on a display device 360.

Figure 4A:
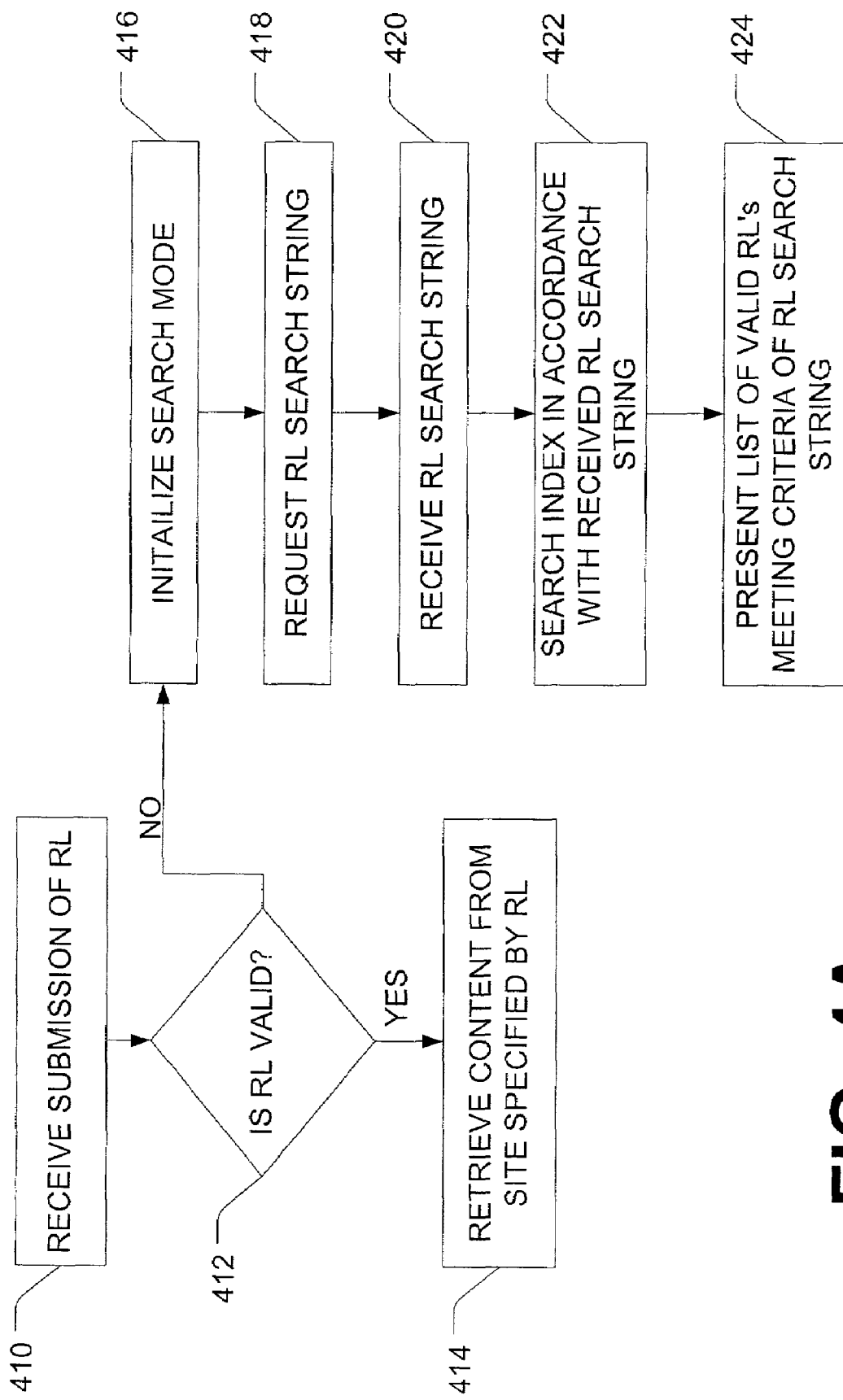
FIG. 4A is a flowchart illustrating one embodiment of the method of the invention.

FIG. 4A shows a flowchart illustrating the method of retrieving a resource according to the present invention. It can be seen that a specified resource locator (RL) that corresponds to a predetermined resource is received (410). If the RL is valid (412) content from the resource associated with the RL will be retrieved (414) and preferably displayed for viewing by the user. Alternatively, the content may be printed out or saved to memory. On the other hand, if the RL is not valid (412) a search mode is initialized (416). In search mode, the user is presented with a request for input of a RL search string (418). The RL search string will be used during search mode to search for the RL of a desired web site/Internet resource. The RL search string will preferably incorporate predefined "wildcard" characters to allow for variations on a specified RL to be considered during the search mode.

A wildcard is a special symbol that stands for one or more characters. Many operating systems and applications support wildcards for identifying, for example, files and directories. This enables a user to select multiple files of interest with a single specification. For example, in operating systems such as DOS and Windows, the asterisk (*) is a wild card that stands for any combination of letters. Thus, the file specification "m*" refers to all files that begin with m. Similarly, the specification "m*.doc" refers to all files that start with m and end with ".doc".

Once a RL search string has been input (420) an index of valid RLs is searched in accordance with the RL search string (422). This index may include a list of all valid RLs, or only a predetermined subset of all valid RLs. The index is preferably stored in memory associated with the user device 110 or the search engine server 115. Subsequently, the user will be presented with a list of valid RLs that meet the criteria of the RL search string (424).

Figure 4B:
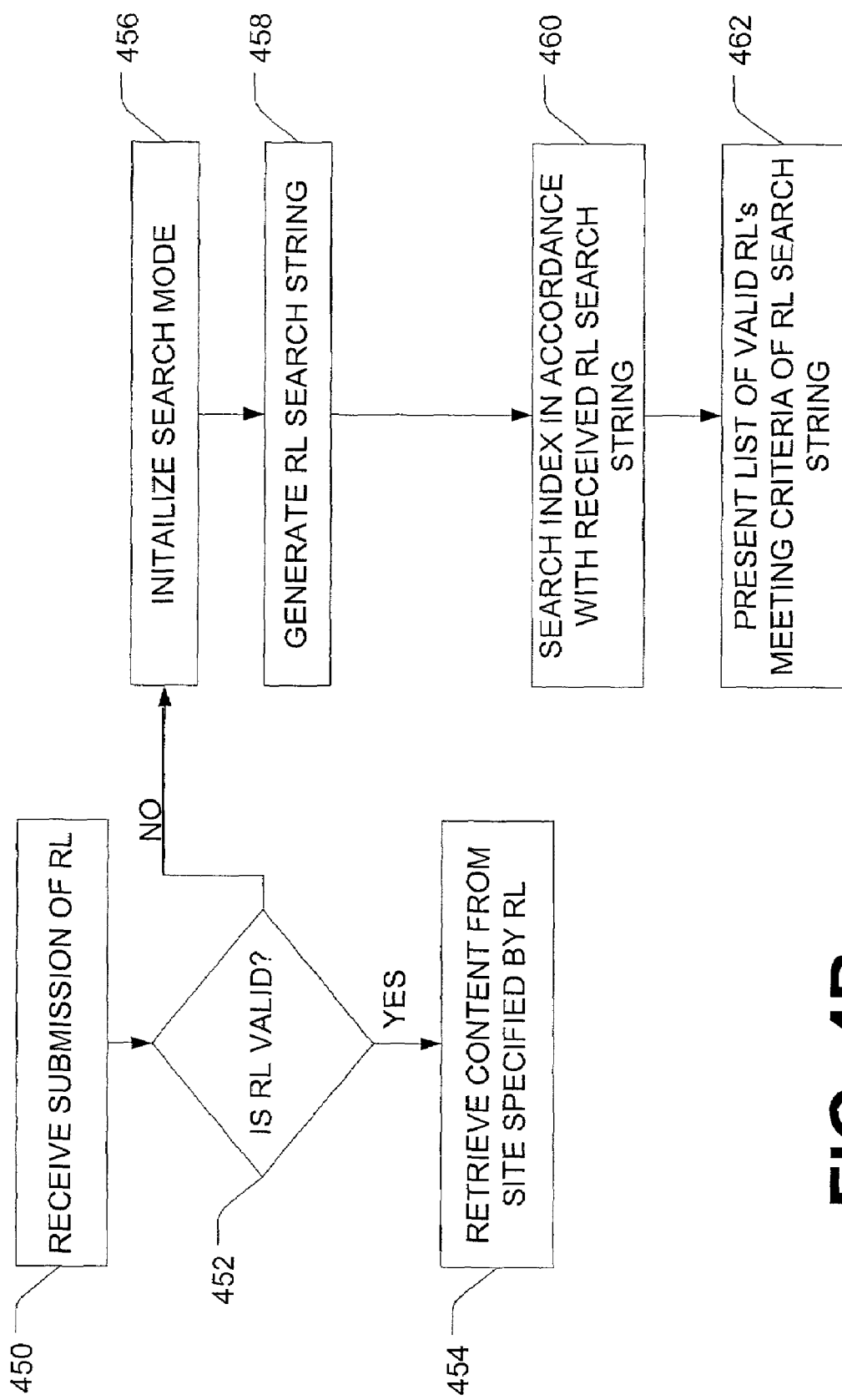
FIG. 4B is a flowchart illustrating another embodiment of the method of the invention.

FIG. 4B shows a flowchart illustrating an alternate embodiment of the method of retrieving a resource according to the present invention. It can be seen that a specified resource locator (RL) that corresponds to a predetermined resource is received (450). If the RL is valid (452) content from the resource associated with the RL will be retrieved (454) and preferably displayed for viewing by the user. Alternatively, the content may be printed out or saved to memory. On the other hand, if the RL is not valid (452) a search mode is initialized (456). In search mode, a RL search string is generated based upon predetermined criteria (458). The RL search string may then be used during search mode to search for the RL of a desired web site/Internet resource. The RL search string will preferably incorporate predefined "wildcard" characters to allow for variations on a specified RL to be considered during the search mode. Once a RL search string has been generated (458) an index of valid RLs is searched in accordance with the RL search string (460). This index may include a list of all valid RLs, or only a predetermined subset of all valid RLs. The index is preferably stored in memory associated with the user device 110 or the search engine server 115 (FIG. 1). Subsequently, the user will be presented with a list of valid RLs that meet the criteria of the RL search string (462).

Figure 5A:
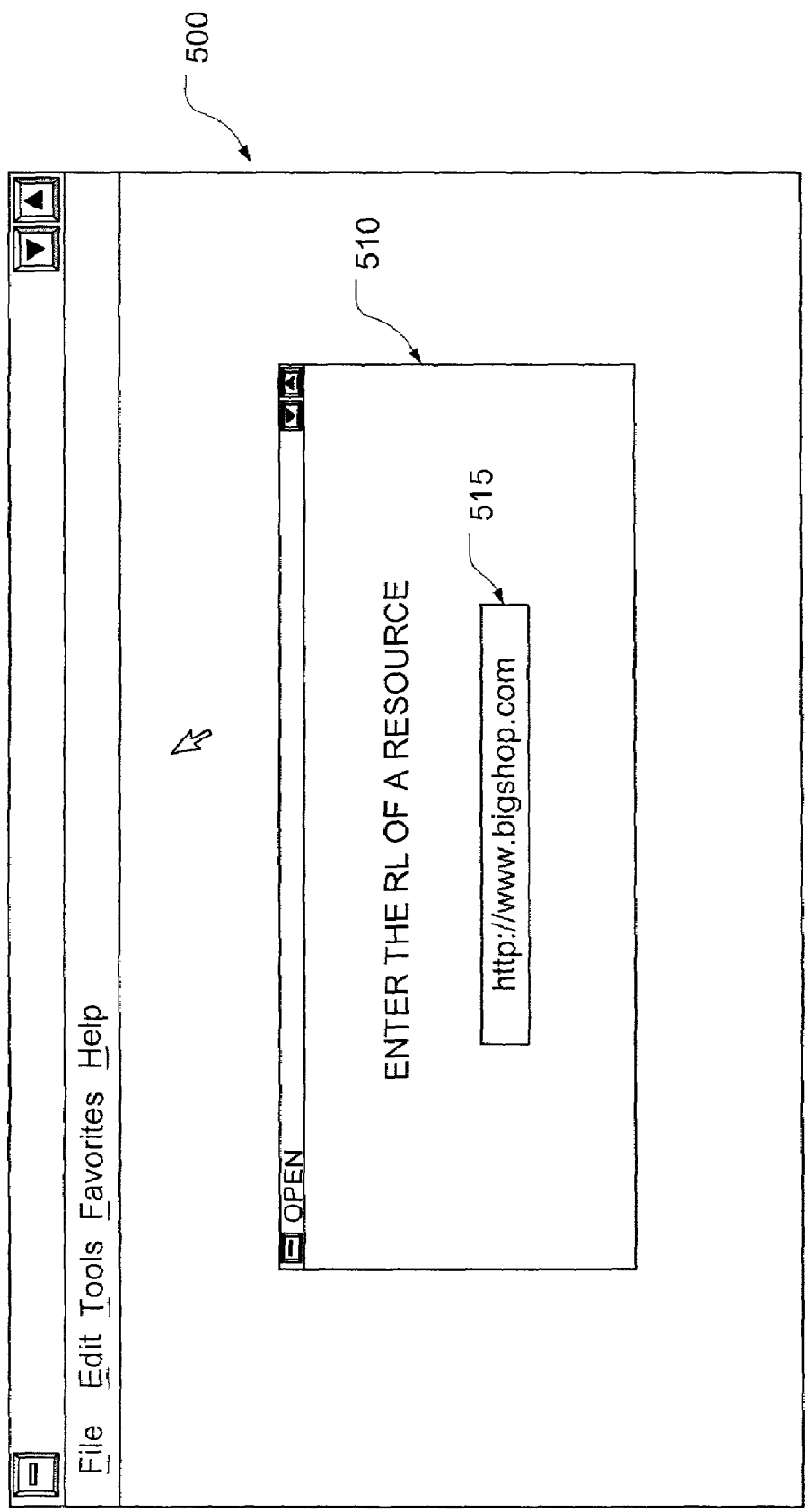
FIG. 5A is a diagram illustrating a graphical user interface (GUI).

User device 110 (FIG. 2) is preferably configured to receive a RL entered by a user. A user may enter a RL that corresponds to, or is thought to correspond to, a resource 102 (FIG. 1) of interest by using, for example, a keyboard 220, pointing device 225 and/or touch screen display 260 to type a RL into an entry field displayed on a display device 260. FIG. 5A illustrates a graphical user interface (GUI) 500 that may be generated by the user device 110 and displayed on display 260 (FIG. 2). This GUI 500 provides a message window 510 that includes an entry field 515 for inputting text data specifying a RL of interest.

The user device 110 (FIG. 1) is further configured to attempt to access the resource 102 (FIG. 1) specified by the RL entered in the entry field 515. If the RL entered into the entry field is not valid and therefore cannot be accessed, the user device 110 is further configured to enter a search mode.

Figure 5B:
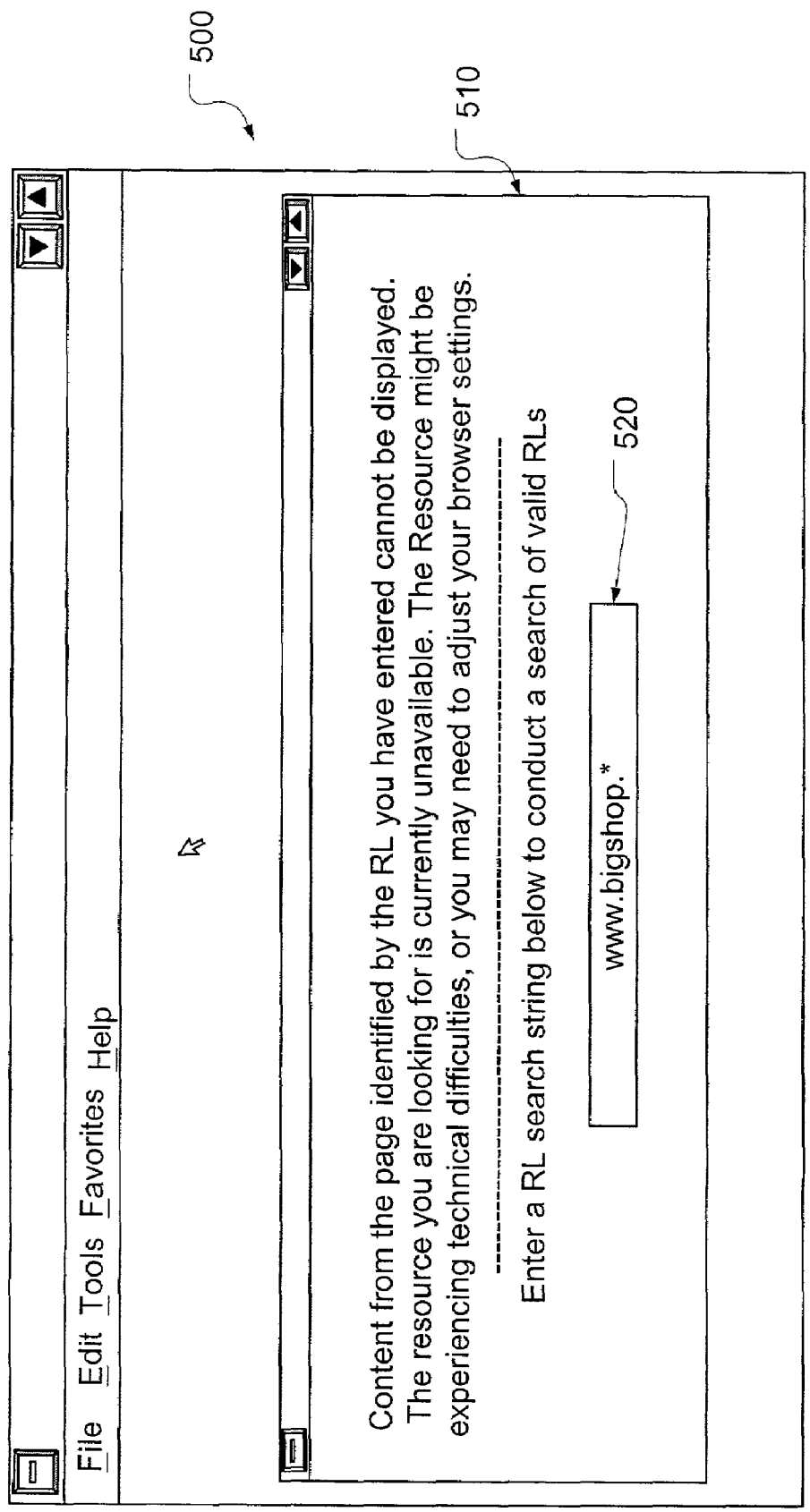
FIG. 5B is a diagram illustrating entry field 520.

With reference to FIG. 5B upon initialization of the search mode, the user device 115 will preferably generate and display a message window 510 advising the user of the failure to access the entered RL and requesting the user to enter a RL search string to conduct a search of a list of valid RLs into a entry field 520. The user device 110 is configured to receive the RL search string data and pass it onto the search engine server 115 via the network 120 (FIG. 2). Search engine server 115 is configured to receive the RL search string and search a list of valid RLs that are stored as a valid RL list 116 (FIG. 1) on memory associated with the RL search server 115. The search engine then conducts a search of the valid RL list 116 to determine what valid RLs meet the criteria specified by the RL search string. Those valid RLs that meet the criteria are identified and a list of all valid RLs that meet the criteria specified by the RL search string is generated and passed to the user device 110 via network 120 (FIG. 1).

Figure 5C:
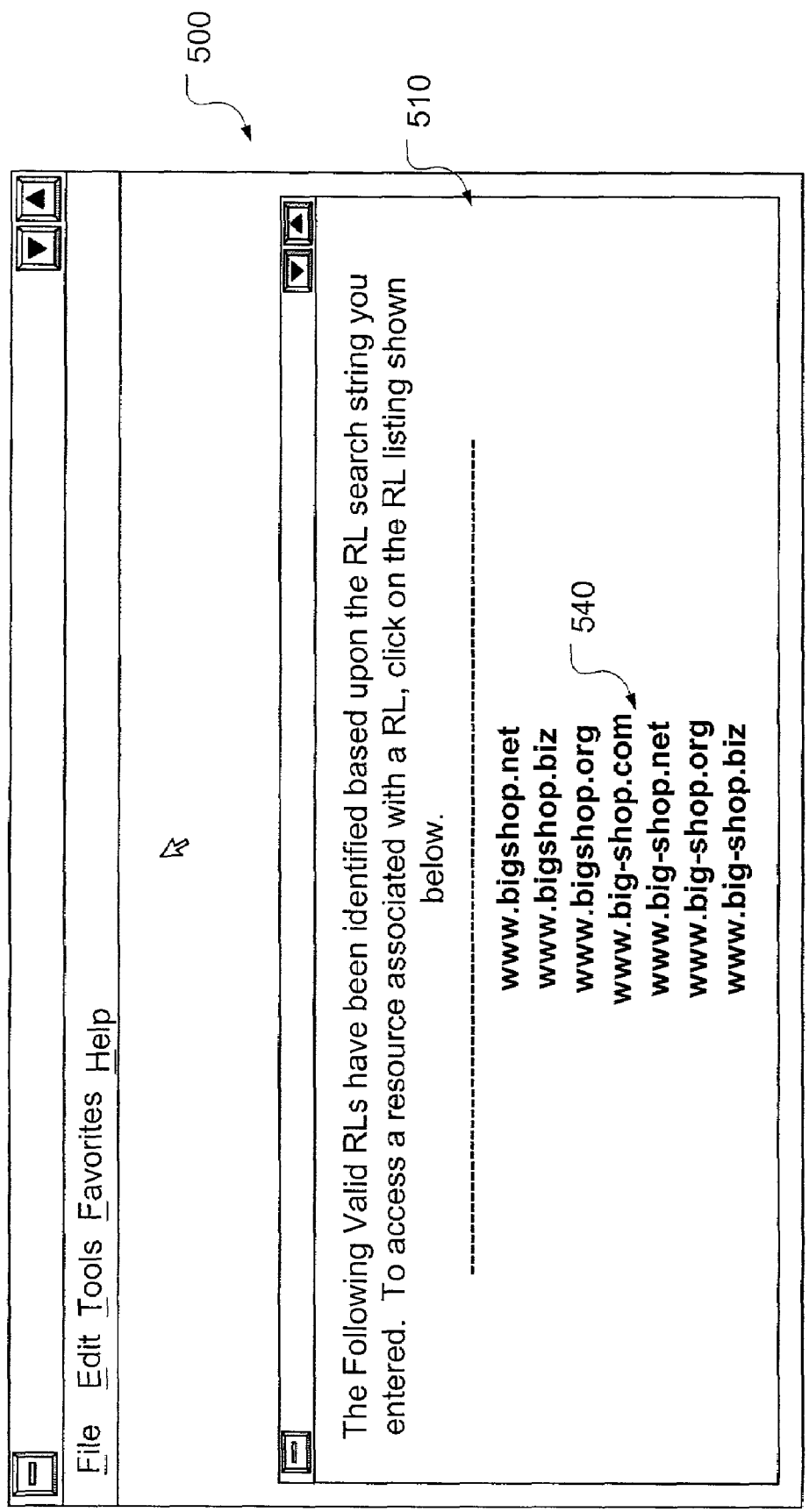
FIG. 5C is a diagram illustrating a message window displaying a listing of valid RLs 540.

User device 110 is preferably configured to display the list of valid RLs that meet the criteria, on display device 260. The list may be displayed so that each valid RL listed is hyper-linked to the resource 102 associated with the particular valid RL specified in the list. A user may then select a RL from the displayed list by, for example, clicking on a hyper-linked RL shown in the displayed list on the display device 260. FIG. 5C illustrates a GUI 500 that displays a message window 510. Message window 510 sets out a listing 540 of valid RLs identified by the search engine server 115 during a search of a list of valid RLs. It should be noted that the RLs shown in FIG. 5B would not necessarily result from the entry of the RL search string entered in the RL search string entry field 515 shown in FIG. 5A. This listing is intended only to illustrate that multiple similar RLs that are known to be valid can be identified and displayed.

The RL search string will include wildcard characters to specify variations of a particular RL. In FIG. 5B a RL search string www.bigshop.* has been entered. This search string includes the wildcard character "*" that is used to specify any and all characters that may occur after the second dot of the RL. The wildcard could also be used at other locations in the RL to request other variations on the desired RL, such as, for example, www.*bigshop.com, www.*shop.com, or www.big*.*. Other wildcard characters may be used as may be desired. In a preferred embodiment, this will cause a search of the list of valid RLs having varying extensions occurring after the second dot.

Figure 5D:
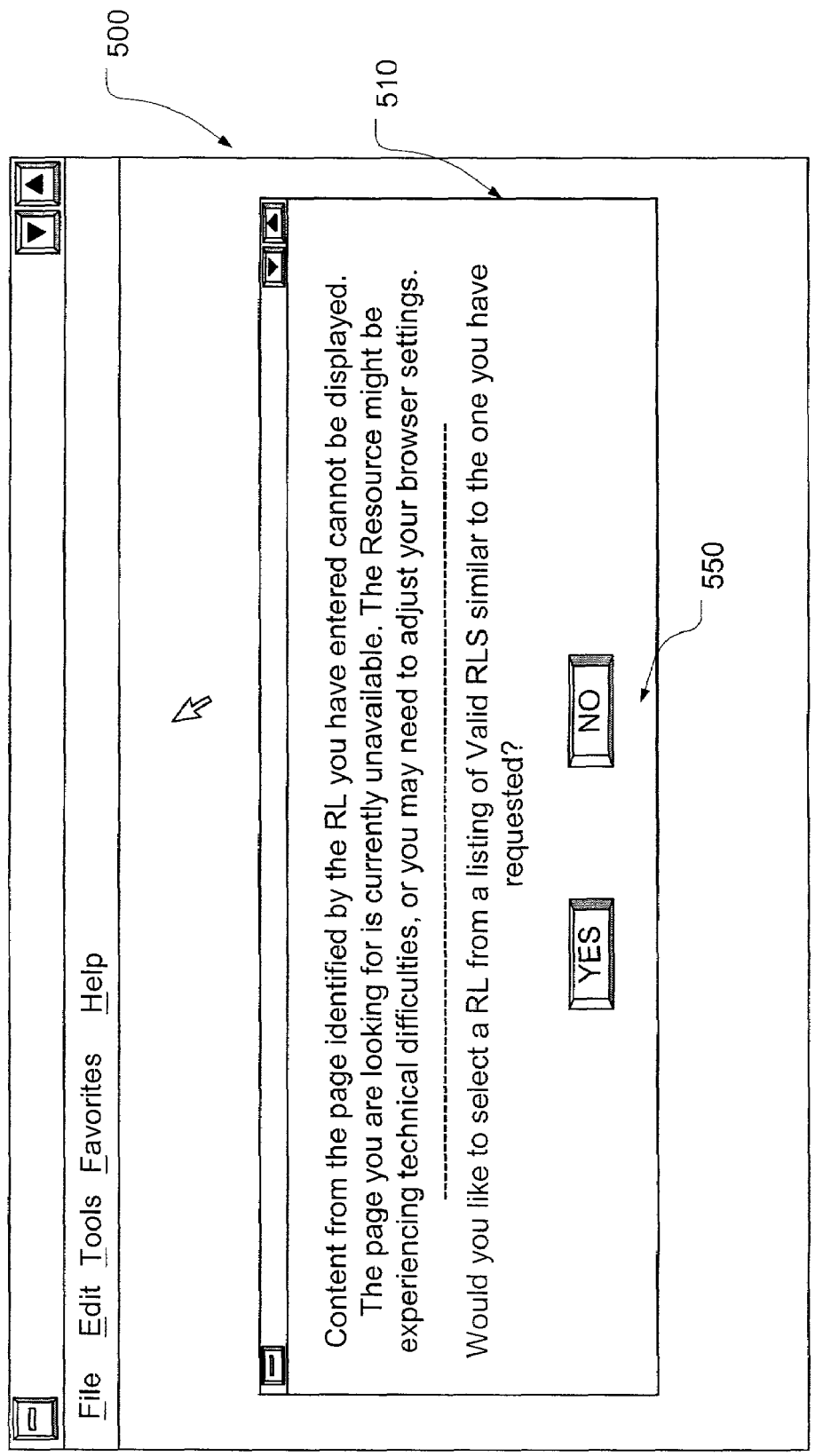
FIG. 5D is a diagram illustrating answer icons 550.

In an alternate embodiment, user device 110 is configured to automatically generate a RL search string once it is determined that a RL entered by the user is invalid. In this embodiment, once the RL entered by the user is determined to be invalid, the user device may be configured to display a message such as that shown in FIG. 5D. Here, the user is advised that the RL entered is invalid and is asked by the message of message window 510 if the user would like to select a RL from a listing of RLs similar to the one the user entered. The user is presented with "YES/NO" answer icons 550 via which the user may indicate whether they desire to select a RL from a listing of similar RLs. In this embodiment, the user device 110 is preferably configured to generate a RL search string based on the RL entered by the user. The RL search string is then forwarded to the search engine server 115 where a search of valid RLs is conducted to identify RLs that meet the criteria of the RL search string. A listing of valid RLs meeting the criteria is then generated by the search engine server 115 and forwarded to the user device 110 via a network 120. The user device 110 displays the list for review and selection by the user. In a further embodiment, the search engine server 115 is configured to generate a RL search string based on the RL entered by the user via user device 110. In this embodiment, the user device 110 is configured to notify the search engine server of the users indication that they desire to select a RL from a listing of valid RLs similar to the one entered by the user.

The flow charts of FIG. 4A and FIG. 4B show the architecture, functionality, and operation of a possible implementation of software that causes the process of locating a resource locator that is associated with a resource of interest to be carried out. In this regard, each block represents a module, segment, or portion of code, which comprises one or more executable instructions for implementing the specified logical function(s). It should also be noted that in some alternative implementations, the functions noted in the blocks may occur out of the order noted in FIG. 4A and/or FIG. 4B. For example, two blocks shown in succession in FIG. 4A and/or FIG. 4B may in fact be executed substantially concurrently or the blocks may sometimes be executed in the reverse order, depending upon the functionality involved, as will be further clarified hereinbelow.

The software 205 (FIG. 2), as well as software 305 (FIG. 3), comprises a listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium then compiled, interpreted or otherwise processed in a suitable manner, if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of accessing a resource associated with a resource locator (RL) comprising the following computer-implemented steps:
   receiving input of a RL at an address box displayed on a user device, said RL corresponds to a resource;
   soliciting input of search terms to the address box if said RL is invalid;
   receiving input of said search terms;
   searching a predetermined index of addresses of valid RLs in accordance with said search terms;
   presenting a list of all valid RLs in said predetermined index with addresses that correspond to said search terms;
   receiving selection of a RL from said list; and
   retrieving and displaying content from said selected RL, wherein said search term describes a name of a location corresponding to said RL.

2. The method of claim 1, wherein said RL comprises a uniform resource locator (URL).

3. The method of claim 1, wherein said resource comprises a resource accessible via the Internet.

4. The method of claim 1, wherein said search term comprises a wildcard representing a predetermined plurality of characters.

5. The method of claim 1, wherein said search term comprises a wildcard.

6. The method of claim 5, wherein said search term is representative of a range of values.

7. The method of claim 1, further comprising the step of retrieving and displaying content from said resource where said RL is valid.

8. A method of accessing a resource associated with a resource locator (RL) comprising the following computer-implemented steps:
   receiving input of a RL at an address box displayed on a user device, said RL corresponding to an address for a resource;
   determining if said RL is valid;
   soliciting input of a RL search string to the address box if said RL is invalid;
   receiving input of said RL search string; and
   searching a predetermined index of valid RLs in accordance with said RL search string to determine valid RLs that meet criteria specified by said RL search string, wherein said search string describes a name of a location corresponding to said RL.

9. The method of claim 8, wherein said RL comprises a uniform resource locator (URL).

10. The method of claim 8, further comprising the step of displaying a list of valid RLs that meet criteria of said RL search string.

11. The method of claim 10, further comprising the step of receiving a selection of a RL specified by said list of valid RLs that meet criteria of said RL search string.

12. The method of claim 11, further comprising the step of accessing and displaying content from a resource associated with said selected RL.

13. A method of selecting a resource locator (RL) comprising the following computer-implemented steps:
   receiving input of a RL at an address box displayed on a user device, said RL corresponding to a resource;
   determining if said RL is valid;
   soliciting input of search terms to the address box if said RL is invalid;
   generating a RL search string at the user device if said RL is invalid; and
   searching a predetermined index of valid RLs in accordance with said RL search string to determine valid RLs that meet the criteria of said RL search string, wherein said RL search term describes a name of a location for a desired resource and said valid RLs have names that correspond to said RL search string.

14. The method of claim 13, wherein said RL comprises a uniform resource locator (URL).

15. The method of claim 13, further comprising the step of displaying a list of valid RLs that meet the criteria of said RL search string.

16. The method of claim 15, further comprising the step of receiving a selection of a RL on said list of valid RLs that meet criteria of said RL search string.

17. The method of claim 16, further comprising the step of accessing and displaying content from a resource associated with said selected RL.

18. A system for accessing a resource associated with a resource locator (RL) comprising:
   controller for receiving a RL search string from an address box on a user device, wherein said RL search string is generated at the user device based upon an invalid RL that was provided as input to the address box on the user device, the input solicited if said RL is invalid;
   memory associated with said controller for storing a list of valid RLs; and
   said controller is further configured to search said list of valid RLs to determine valid RLs that meet criteria of said RL search string, wherein said RL search string describes a name of a location for a desired resource and said valid RLs have names that correspond to said RL search string.

19. The system of claim 18, wherein said RL comprises a uniform resource locator (URL).

20. The system of claim 18, wherein said controller is further configured to generate a list of valid RLs meeting criteria of said RL search string.

21. The system of claim 20, wherein said controller is further configured to forward said list of valid RLs meeting said criteria to said user device.

22. The system of claim 21, wherein said controller forwards said list of valid RLs to said user device via a network.

23. The system of claim 18, wherein said RL search string comprises a wildcard character representing a predetermined character.

24. A system for accessing a resource associated with a resource locator (RL) comprising:
   controller for receiving a RL from an address box on a user device;
   memory associated with said controller for storing a list of valid RLs at the user device;
   said controller is configured to solicit a RL search string to be entered into the address box if said RL is determined to be invalid; and
   said RL search string comprises a wildcard, wherein said RL search term describes a name of a location for a desired resource and said valid RLs have names that correspond to said RL search string.

25. The system of claim 24, wherein said RL comprises a uniform resource locator (URL).

26. The system of claim 24, wherein said controller is further configured to search said list of valid RLs in accordance with said RL search string to identify valid RLs that meet criteria of said RL search string.

27. The system of claim 26, wherein said controller is further configured to forward said list of valid RLs meeting said criteria to said user device.

28. The system of claim 27, wherein said controller forwards said list of valid RLs to said user device via a network.

29. The system of claim 24, wherein said wildcard represents a predetermined character.

* * * * *

UNITED STATES PATENT AND TRADEMARK OFFICE
CERTIFICATE OF CORRECTION

| | | |
|---|---|---|
| PATENT NO. | : 7,693,932 B1 | Page 1 of 1 |
| APPLICATION NO. | : 10/047629 | |
| DATED | : April 6, 2010 | |
| INVENTOR(S) | : Conrad K. Meyer | |

It is certified that error appears in the above-identified patent and that said Letters Patent is hereby corrected as shown below:

On the title page, item (75), Inventors, in column 1, line 1, delete "Greeley" and insert -- Ault --, therefor.

Signed and Sealed this

Seventeenth Day of August, 2010

David J. Kappos
*Director of the United States Patent and Trademark Office*